(12) United States Patent
Zaghib et al.

(10) Patent No.: US 9,034,490 B2
(45) Date of Patent: May 19, 2015

(54) MULTILAYER MATERIAL, METHOD FOR MAKING SAME AND USE AS ELECTRODE

(71) Applicant: HYDRO-QUEBEC, Montreal (CA)

(72) Inventors: Karim Zaghib, Longueuil (CA); Michel Petitclerc, Notre-Dame-du-Mont-Carmel (CA); Patrick Charest, Sainte-Julie (CA); Abdelbast Guerfi, Brossard (CA); Martin Dontigny, Varennes (CA)

(73) Assignee: Hydro-Quebec, Montreal, Quebec (CA)

( * ) Notice: Subject to any disclaimer, the term of this patent is extended or adjusted under 35 U.S.C. 154(b) by 0 days.

(21) Appl. No.: 13/857,902

(22) Filed: Apr. 5, 2013

(65) Prior Publication Data

US 2013/0216914 A1    Aug. 22, 2013

Related U.S. Application Data

(63) Continuation of application No. 12/162,933, filed as application No. PCT/CA2007/000141 on Jan. 31, 2007, now Pat. No. 8,435,671.

(30) Foreign Application Priority Data

Feb. 1, 2006   (CA) ..................................... 2535064

(51) Int. Cl.
*H01M 4/485* (2010.01)
*H01M 4/58* (2010.01)
(Continued)

(52) U.S. Cl.
CPC ............ *H01M 4/485* (2013.01); *H01M 4/0404* (2013.01); *H01M 4/0421* (2013.01); *H01M 4/0426* (2013.01); *H01M 4/131* (2013.01); *H01M 4/133* (2013.01); *H01M 4/134* (2013.01); *H01M 4/136* (2013.01); *H01M 4/1391* (2013.01); *H01M 4/1393* (2013.01); *H01M 4/1395* (2013.01); *H01M 4/1397* (2013.01); *H01M 4/366* (2013.01); *H01M 4/621* (2013.01); *H01M 10/0525* (2013.01);
(Continued)

(58) Field of Classification Search
None
See application file for complete search history.

(56) References Cited

U.S. PATENT DOCUMENTS

| 6,258,480 | B1 * | 7/2001 | Moriwaki et al. ............ 429/176 |
| 6,887,617 | B2 | 5/2005 | Sato et al. |

(Continued)

FOREIGN PATENT DOCUMENTS

| FR | 2823013 A1 | 10/2002 |
| JP | 09185960 A | 7/1997 |

(Continued)

OTHER PUBLICATIONS

Arnold, et al., J of Power Sources 119-121 (2003) pp. 247-251.
(Continued)

*Primary Examiner* — Vera Katz
(74) *Attorney, Agent, or Firm* — Buchanan Ingersoll & Rooney P.C.

(57) ABSTRACT

A multilayer material including a solid substrate and at least two superimposed solid layers containing particles of an electrochemically active material, the first solid layer adhering to the solid substrate and the second solid layer adhering to the first solid layer. The multilayer material has a constant thickness of upper layer not less than 95% and a depth of penetration of the second layer into the first layer which is less than 10% of the thickness of the first layer, and enables as electrode constituent, generators having a low risk of overload degradation to be prepared.

27 Claims, 7 Drawing Sheets

CATHODE CONFIGURATION:
A: $LiCoO_2$, $LiMn_2O_4$, $LiNiO_2$, $LiNi_{1/3}Co_{1/3}Mn_{1/3}O_2$
B: $LiFePO_4$

ANODE CONFIGURATION:
B: $Li_4Ti_5O_{12}$, Sn, Al, Ag, $SiO_x$, $SiO_x$-graphite, $SiO_x$-carbon, $0<x\leq2$
A: natural or artificial graphite or carbon Case I:
1- Current collector
A- Cathode based on a water-soluble binder
B- Cathode based on a binder soluble in an organic solvent Case II:
A'- Cathode based on a binder soluble in an organic solvent
B'- Cathode based on a water-soluble binder

(51) Int. Cl.
*H01M 4/04* (2006.01)
*H01M 4/131* (2010.01)
*H01M 4/133* (2010.01)
*H01M 4/134* (2010.01)
*H01M 4/136* (2010.01)
*H01M 4/1391* (2010.01)
*H01M 4/1393* (2010.01)
*H01M 4/1395* (2010.01)
*H01M 4/1397* (2010.01)
*H01M 4/36* (2006.01)
*H01M 4/62* (2006.01)
*H01M 10/0525* (2010.01)
*H01M 10/0565* (2010.01)
*H01M 10/0568* (2010.01)
*H01M 10/0569* (2010.01)

(52) U.S. Cl.
CPC ......... *H01M 4/5805* (2013.01); *H01M 4/5825* (2013.01); *H01M 10/0565* (2013.01); *H01M 10/0568* (2013.01); *H01M 10/0569* (2013.01); *H01M 2300/0085* (2013.01); *H01M 2300/0091* (2013.01); *Y02E 60/122* (2013.01)

(56) References Cited

U.S. PATENT DOCUMENTS

| | | | |
|---|---|---|---|
| 2002/0015885 A1* | 2/2002 | Hara et al. | 429/212 |
| 2002/0172864 A1 | 11/2002 | Yoshimura et al. | |
| 2003/0039889 A1* | 2/2003 | Park et al. | 429/231.1 |
| 2003/0054249 A1 | 3/2003 | Yamamoto et al. | |
| 2004/0043149 A1 | 3/2004 | Gordon et al. | |
| 2004/0258997 A1 | 12/2004 | Utsugi et al. | |
| 2005/0008935 A1 | 1/2005 | Skotheim et al. | |
| 2005/0031925 A1* | 2/2005 | Ofer et al. | 429/30 |
| 2005/0089757 A1 | 4/2005 | Bannai et al. | |
| 2005/0186474 A1 | 8/2005 | Jiang et al. | |
| 2006/0019151 A1 | 1/2006 | Imachi et al. | |
| 2006/0099495 A1 | 5/2006 | Suzuki et al. | |
| 2006/0216603 A1 | 9/2006 | Choi | |
| 2007/0275302 A1* | 11/2007 | Sotowa et al. | 429/217 |
| 2008/0220330 A1 | 9/2008 | Hosaka et al. | |

FOREIGN PATENT DOCUMENTS

| | | |
|---|---|---|
| JP | H11-067214 A | 3/1999 |
| JP | 2004-179005 A | 6/2004 |
| JP | 2006-004739 A | 1/2006 |
| KR | 4100259 A | 12/2004 |
| WO | 2004/045007 A2 | 5/2004 |
| WO | WO 2005067081 A1 * | 7/2005 |

OTHER PUBLICATIONS

International Search Report (PCT/ISA/210) dated May 22, 2007, issued in PCT/CA2007/000141.

* cited by examiner

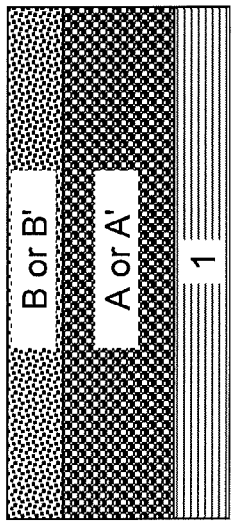

FIG. 1

CATHODE CONFIGURATION:
A: LiFePO$_4$
B: LiCoO$_2$, LiMn$_2$O$_4$, LiNiO$_2$, LiNi$_{1/3}$Co$_{1/3}$Mn$_{1/3}$O$_2$

ANODE CONFIGURATION:
A: natural or artificial graphite or carbon
B: Li$_4$Ti$_5$O$_{12}$, Sn, Al, Ag, SiO$_x$, SiO$_x$-graphite, SiO$_x$-carbon, 0<x≤2

Case I:
1- Current collector
A- Layer based on a water-soluble binder
B- Layer based on a binder soluble in an organic solvent Case II:
A'- Layer based on a binder soluble in an organic solvent
B'- Layer based on a water-soluble binder Case III:
1- Current collector
A- Layer with no binder
B- Layer with binder Case IV:
A'- Layer with binder
B'- Layer with no binder

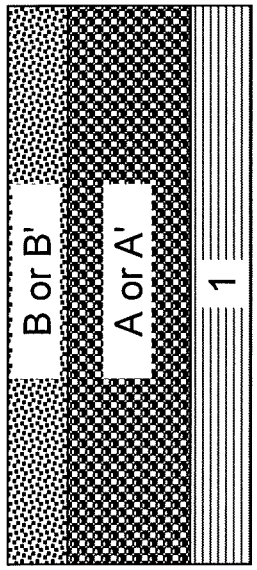

CATHODE CONFIGURATION:
A: $LiCoO_2$, $LiMn_2O_4$, $LiNiO_2$, $LiNi_{1/3}Co_{1/3}Mn_{1/3}O_2$
B: $LiFePO_4$

ANODE CONFIGURATION:
B: $Li_4Ti_5O_{12}$, Sn, Al, Ag, $SiO_x$, $SiO_x$-graphite, $SiO_x$-carbon, $0<x\leq2$
A: natural or artificial graphite or carbon Case I:
1- Current collector
A- Cathode based on a water-soluble binder
B- Cathode based on a binder soluble in an organic solvent Case II:
A'- Cathode based on a binder soluble in an organic solvent
B'- Cathode based on a water-soluble binder

FIG. 2

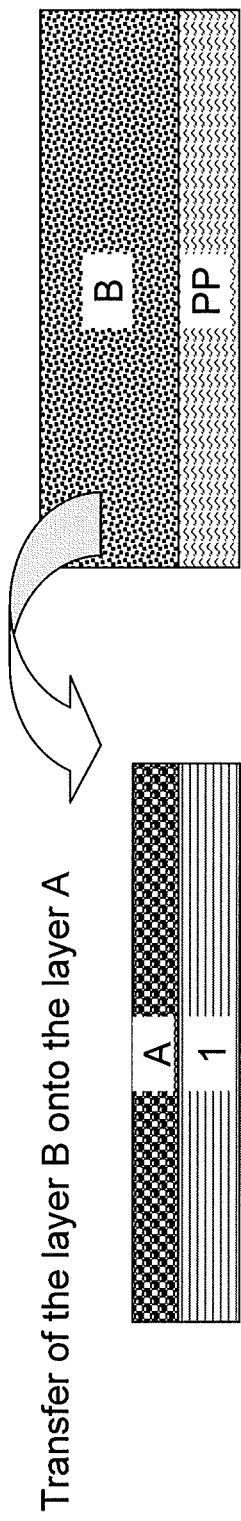

Transfer of the layer B onto the layer A

CATHODE CONFIGURATION:
A: LiFePO$_4$
B: LiCoO$_2$, LiMn$_2$O$_4$, LiNiO$_2$, LiNi$_{1/3}$Co$_{1/3}$Mn$_{1/3}$O$_2$

ANODE CONFIGURATION:
A: natural or artificial graphite or carbon
B: Li$_4$Ti$_5$O$_{12}$, Sn, Al, Ag, SiO$_x$, SiO$_x$-graphite, SiO$_x$-carbon, $0 < x \leq 2$ Case 3:
1- Current collector
A- Layer based on a binder soluble in water or in an organic solvent
B- Layer based on a binder soluble in water or in an organic solvent

FIG. 3

MULTILAYER MATERIAL, METHOD FOR MAKING SAME AND USE AS ELECTRODE

CROSS REFERENCE TO RELATED APPLICATIONS

This application is a continuation of U.S. application Ser. No. 12/162,933, filed on Dec. 5, 2008, which is a national stage application of International Application No. PCT/CA2007/00141, filed Jan. 1, 2007, and claims priority to Canadian Application No. 2,535,064, filed Feb. 1, 2006. The entire contents of each of U.S. application Ser. No. 12/162,933, International Application No. PCT/CA2007/00141, and Canadian Application No. 2,535,064 are hereby incorporated herein by reference in their entirety.

FIELD OF THE INVENTION

The present invention relates to multilayer materials comprising a solid support and at least two superposed solid layers which contain particles of an electrochemically active material. These multilayer materials are characterized in particular by a low interpenetration between adjacent solid layers.

The present invention also relates to processes for forming the multilayer materials of the invention, especially those which include a step of coating a mixture comprising particles of electrochemically active materials.

The present invention also relates to the multilayer electrodes obtained by the process of the invention, these having remarkable mechanical and electrochemical properties.

Finally, the present invention relates to the electrochemical generators that incorporate at least one electrode based on a multilayer material of the invention and are characterized by exceptional safety. These generators are particularly suitable for use in portable electronic systems and in hybrid vehicles, especially thanks to a high resistance in the presence of an overcharge.

PRIOR ART

The advantage of double-layer electrodes has recently been indicated by Naoki Imachi et al., during the 46$^{th}$ symposium on batteries that was held from 16 to 18 November 2005 in Nagoya, Japan, summary on pages 168 to 169, published in the Proceedings, mentioning that a double-layer cathode, the first layer of which is based on $LiFePO_4$, the second layer of which is based on $LiCoO_2$ acting as active material and the collector of which consists of an aluminum foil, has an effect on the overcharge tolerance based on the change in resistance of $Li_{1-x}FePO_4$ with respect to x. This $LiFePO_4/LiCoO_2$-based double-layer cathode, although having achieved a certain progress, was shown to be of limited interest.

There therefore was a need to develop electrode materials devoid of at least one of the drawbacks of the known materials and offering in particular a good overcharge resistance.

SUMMARY

The first subject of the invention is the family of multilayer materials comprising a solid support and at least two superposed solid layers which contain particles of an electrochemically active material, the first solid layer adhering to the solid support and the second solid layer adhering to the first solid layer. This multilayer material is furthermore characterized in that it has at least one of the following properties:

a thickness of the first solid layer which is, measured using the electron microscope method, constant to 95% or higher, and preferably constant to 97% or higher;

a thickness of the second solid layer which is, measured using the scanning electron microscope method, constant to 95% or higher, and preferably constant to 97% or higher; and a depth of penetration of the second solid layer into the first solid layer which is less than 10% of the thickness of the first solid layer, and preferably less than 5% of the thickness of the first solid layer.

Preferably the electrochemically active material may be a complex oxide corresponding to the general formula $A_aM_mZ_zO_oN_nF_f$ in which:

A comprises an alkali metal;

M comprises at least one transition metal, and optionally a metal other than a transition metal, or mixtures thereof;

Z comprises at least one nonmetal;

O is oxygen; N is nitrogen and F is fluorine; and the coefficients a, m, z, o, n, f≥0 being chosen so as to ensure electroneutrality.

A preferred subfamily of multilayer materials of the invention may be formed by the multilayer materials in which the first solid layer is of a different nature to that of the electrochemically active material present in the second solid layer.

Another preferred subfamily of multilayer materials of the invention may be formed by the materials in which the first and second solid layers each contain a binder for the electrochemically active particles present in said first and second solid layers, and the binder present in a solid layer preferably representing between 0 and 99%, even more preferably between 1 and 95%, of the weight of the solid layer in which it is present.

Preferably, the binder present in the first solid layer may be of a different nature from that of the binder present in the second solid layer.

Advantageously, one of the solid layers may contain a thickener, the thickener present in a solid layer preferably representing between 0 and 98%, even more preferably between 0 and 94%, of the weight of the solid layer in which it is present.

Preferably, the binder present in the first layer may be soluble at 25° C. in a solvent $S_1$ with a concentration of greater than 1 gram per liter and the binder present in the second solid layer may be soluble at 25° C. in the solvent $S_1$ with a concentration of less than 1 gram per liter.

Advantageously, the binder present in the second layer may be soluble at 25° C. in a solvent $S_2$ with a concentration of greater than 1 gram per liter and the binder present in the second layer may be soluble at 25° C. in the solvent $S_2$ with a concentration of less than 1 gram per liter.

A preferred subfamily of multilayer materials of the invention may be formed by the multilayer materials that include a third protective layer, preferably one based on a solid material of the $Li_3PO_4$ type adhering to the second solid layer on the surface of the second layer that is not in contact with the first layer.

A preferred subfamily of multilayer materials of the invention may be formed by the cathode multilayer materials.

Advantageously, in these multilayer materials:

the first solid layer may be based on a material chosen from the group formed by materials of the $LiFePO_4$, carbon-coated $LiFePO_4$, $FePO_4$ and carbon-coated $FePO_4$ type, and of the type comprising a mixture of at least two of the latter; even more preferably, the first layer may be of the $LiCoO_2$, $LiMn_2O_4$, $LiMn_{1/3}Co_{1/3}Ni_{1/3}O_2$ or $LiNi_x$-

$Co_yAl_zO_2$, (0<x, y, z<1), type, or of the type comprising a mixture of at least two of these materials; and/or the second solid layer may be based on a material of the $LiCoO_2$, $LiMn_2O_4$, $LiMn_{1/3}Co_{1/3}Ni_{1/3}O_2$ or $LiNi_xCo_y$-$Al_zO_2$, (0<x, y, z<1), type, or on a mixture of at least two of these materials; even more preferably, the second layer may be of the $LiFePO_4$, carbon-coated $LiFePO_4$, $FePO_4$ or carbon-coated $FePO_4$ type, or of the type comprising a mixture of at least two of the latter.

Advantageously, the binder in the first solid layer may be of the water-soluble binder type.

Also advantageously, the binder in the second solid layer may be of the PVDF or PTFE type.

Preferably, the binder in the first layer may be of the PVDF or PTFE type.

Preferably, the binder in the second layer may be of the water-soluble binder type.

Advantageously, the thickener may be of the Cellogen® type.

According to one particularly advantageous combination, the binder in the first solid layer may be of the water-soluble binder type and the binder of the second solid layer may be of the NMP or cyclopentanone type.

According to another particularly advantageous combination, the binder in the first layer may be of the NMP or cyclopentanone type and the binder of the second layer may be of the water-soluble binder type.

A preferred subfamily of multilayer materials of the invention may be formed by the anode multilayer materials. In these multilayer materials, preferably:

the first solid layer may be of the natural graphite type or artificial graphite type or of the type comprising a mixture of at least two of the latter, and the second solid layer may be of the $Li_4Ti_5O_{12}$, Sn, Al, Ag, Si, $SiO_x$, $SiO_x$-graphite or $SiO_x$-carbon type, or of the type comprising a mixture of at least two of the latter, with x greater than 0 but not exceeding 2; or the first solid layer may be of the $Li_4Ti_5O_{12}$, Sn, Al, Ag, Si, $SiO_x$, $SiO_x$-graphite or $SiO_x$-carbon type, and the second solid layer may be of the natural graphite or artificial graphite type, or of the type comprising a mixture of at least two of the latter, with x greater than 0 but not exceeding 2.

According to one advantageous embodiment, the binder present in the first solid layer may then be water-soluble.

According to another advantageous embodiment, the first solid layer may contain a thickener of the Cellogen® type.

Advantageously, the binder present in the second solid layer of the multilayer material may be PVDF.

Preferably, the binder present in the first solid layer may be PVDF or PTFE.

Advantageously, the binder used in the first solid layer may be PVDF or PTFE and NMP or cyclopentanone.

Even more advantageously, the binder present in the second solid layer may be water-soluble.

Preferably, the binder used in the second solid layer may be PVDF or PTFE and NMP.

According to a variant of particular advantage, the binder used in the second solid layer may be water-soluble.

A preferred subfamily of multilayer materials of the invention may be formed by the materials in which the solid support comprises a material chosen:

in the case of an anode: from the group formed by copper and expanded copper, aluminum and nickel, and preferably from the group formed by copper and expanded copper; and in the case of a cathode: from the group formed by aluminum, carbon-coated aluminum, expanded aluminum, expanded carbon-coated aluminum, titanium and platinum, preferably from the group formed by aluminum, carbon-coated aluminum and expanded aluminum.

Preferably, in the multilayer materials of the invention, the thickness of:

the first layer may be between 1 and 200 µm, preferably between 10 and 120 µm;

the second layer may be between 1 and 200 µm, preferably between 10 and 120 µm; and the protective layer may be between 500 nanometers and 16 µm, preferably between 1 and 5 µm.

One particularly advantageous subfamily of materials of the invention may be composed of the anode multilayer materials comprising a solid support and two superposed solid layers:

the first solid layer comprising:
between 1 and 100%, preferably between 15 and 97%, by weight of an active material;
between 0 and 99%, preferably between 2 and 84%, by weight of a binder; and
between 0 and 98%, preferably between 1 and 83%, by weight of a thickener; and the second solid layer comprising:
between 1 and 100%, preferably between 15 and 97% %, by weight of an active material;
between 0 and 99%, preferably between 2 and 84%, by weight of a binder; and
between 0 and 98%, preferably between 1 and 83%, by weight of a thickener.

One particularly advantageous subfamily of materials of the invention may be composed of the cathode multilayer materials comprising a solid support and two superposed solid layers:

the first solid layer comprising:
between 1 and 100%, preferably between 15 and 97% %, by weight of an active material;
between 0 and 98%, preferably between 2 and 84%, by weight of a binder; and
between 0 and 99%, preferably between 1 and 83%, by weight of a thickener; and the second solid layer comprising:
between 1 and 100%, preferably between 15 and 97% %, by weight of an active material;
between 0 and 98%, preferably between 2 and 84%, by weight of a binder; and
between 0 and 99%, preferably between 1 and 83%, by weight of a thickener.

Another particularly advantageous subfamily of anode multilayer materials may comprise a solid support, two superposed solid layers and a protective layer:

the first solid layer comprising:
between 1 and 100%, preferably between 15 and 97% %, by weight of an active material;
between 0 and 99%, preferably between 2 and 84%, by weight of a binder; and
between 0 and 98%, preferably between 1 and 83%, by weight of a thickener;

the second solid layer comprising:
between 1 and 100%, preferably between 15 and 97%, by weight of an active material;
between 0 and 99%, preferably between 2 and 84%, by weight of a binder; and
between 0 and 98%, preferably between 1 and 83%, by weight of a thickener; and the protective layer comprising:
- between 1 and 100%, preferably between 15 and 97%, by weight of an active material;
- between 0 and 99%, preferably between 2 and 84%, by weight of a binder; and
- between 0 and 98%, preferably between 1 and 83%, by weight of a thickener.

Another preferred subfamily may be formed by the cathode multilayer materials comprising a solid support, two superposed solid layers and a protective layer:

the first solid layer comprising:
- between 1 and 100%, preferably between 15 and 97%, by weight of an active material;
- between 0 and 99%, preferably between 2 and 84%, by weight of a binder; and
- between 0 and 98%, preferably between 1 and 83%, by weight of a thickener;

the second solid layer comprising:
- between 1 and 100%, preferably between 15 and 97%, by weight of an active material;
- between 0 and 99%, preferably between 2 and 84%, by weight of a binder; and
- between 0 and 98%, preferably between 1 and 83%, by weight of a thickener; and the protective layer comprising:
- between 1 and 100%, preferably between 15 and 97%, by weight of an active material;
- between 0 and 99%, preferably between 2 and 84%, by weight of a binder; and
- between 0 and 98%, preferably between 1 and 83%, by weight of a thickener.

Another preferred subfamily of multilayer materials according to the invention may be formed by the materials in which:
- the support has a thickness of between 1 and 100 µm;
- the first layer has a thickness of between 1 and 200 µm;
- the second solid layer has a thickness of between 1 and 200 µm; and
- the protective layer has, when present, a layer of between 0.5 and 5 µm.

A second subject of the present invention is formed by processes for forming a multilayer material comprising a solid support and at least two superposed solid layers, the first solid layer which contains particles of a first electrochemically active material, which may or may not be bonded by a binder for said particles, and adhering to the solid support; and the second solid layer which contains particles of a second electrochemically active material, which may or may not be bonded by a binder for said particles, and being of a different nature from that of the electrochemically active material present in the first solid layer, these processes comprising:

in the case in which the two solid layers include a binder, at least the following steps:
- a) the coating, on the solid support, of a mixture comprising the particles of the first electrochemically active material, a binder for this first electrochemically active material and the solvent for the binder;
- b) the evaporation of the solvent still present in the first layer after the coating and formation of the first solid layer;
- c) the coating, on the first solid layer, of a mixture comprising the particles of the second electrochemically active material, a binder for the second electrochemically active material and a solvent for the binder; and
- d) the evaporation of the solvent present in the second layer after the coating and formation of the second solid layer;

in the case in which one of the solid layers does not include a binder, at least the following steps:
- a') the formation, on the solid support, by a physical or chemical method, of a solid layer consisting of a first active material but not containing a binder;
- b') the coating, on the solid layer formed in step a'), of a mixture comprising the particles of a second electrochemically active material of a different nature to that present in the binderless solid layer, a binder for the second electrochemically active material and a solvent for the binder; and
- c') the evaporation of the solvent present in the second layer after the coating and formation of the second solid layer in step b'), or else the following steps:
- a") the coating, on the solid support, of a mixture comprising the particles of a first electrochemically active material, a binder for the first electrochemically active material and a solvent for the binder;
- b") the evaporation of the solvent present in the first layer after the coating and formation of the first solid layer; and
- c") the formation, by a physical or chemical method, on the first solid layer formed in step b"), of a solid layer consisting of a second electrochemically active material different from that present in the first solid layer but not containing a binder;

and in the case in which none of the solid layers includes a binder, at least the following steps:
- a''') the formation, directly on the solid support, by a physical or chemical method, of a first solid layer consisting of a first electrochemically active material but not containing a binder; and
- b''') the formation, directly on the first solid layer formed in step a'''), by a physical or chemical method, of a second solid layer consisting of a second active material different from the electrochemically active material present in the first solid layer but not containing a binder, or else the following steps:
- a'''') the formation, outside the solid support, by a physical or chemical method, of a first solid layer consisting of a first electrochemically active material but not containing a binder;
- b'''') the application of the first solid layer obtained in step a'''') on the solid support; and
- c'''') the formation, directly on the first solid layer attached to the solid support in step b''''), by a physical or chemical method, of a solid layer consisting of a second electrochemically active material but not containing a binder, or else the following steps:
- a''''') the formation, directly on the solid support, by a physical or chemical method, of a first solid layer consisting of a first electrochemically active material but not containing a binder; and
- b''''') the formation, outside the solid support material covered in step a''''') with the first solid layer, by a physical or chemical method, of a second solid layer consisting of a second electrochemically active material but not containing a binder; and
- c''''') the application of the second solid layer obtained in step b''''') on the solid support covered with the first solid layer, or else the following steps:
a''''') the formation, outside the solid support, by a physical or chemical method, of a first solid layer consisting of a first electrochemically active material but not containing a binder;
b''''') the application of the first layer obtained in step a''''') on the solid support;
c''''') the formation, outside the solid support material covered with the first solid layer, by a physical or chemical method, of a second solid layer consisting of a second electrochemically active material but not containing a binder, and the application of the second solid layer thus obtained on the solid support covered with the first solid layer obtained in step a'''''); and
d''''') the application of the second layer obtained in step c''''') on the solid support covered with the first layer in step b''''').

Preferably, according to one advantageous method of implementing the processes of the invention, the solvent/binder mixture used in step c) cannot dissolve the first solid layer or can dissolve it only very slightly, and does so preferably with an extent of less than 1 gram per liter at 25° C.

The processes of the invention may advantageously be used for the manufacture of cathodes.

The manufacture of the first solid layer may advantageously be carried out using a doctor blade or by extrusion on an aluminum collector, and the second layer may be coated on the first layer.

According to another advantageous variant, the manufacture of the first layer may be obtained by vertical coating on an aluminum collector of the expanded metal type, it being possible for the second layer to be obtained by vertical coating on the first layer.

The manufacture of the second layer may advantageously be obtained using a doctor blade or by extrusion on the first layer.

The second layer may preferably be coated on a PP (polypropylene) support and then transferred by lamination onto the first layer.

Advantageously, the binder used to manufacture the two layers may be of the PVDF or PTFE type and the solvent used may be of the NMP or cyclopentanone type, the solvent used to form the second layer having not to dissolve the binder of the first layer.

According to another advantageous method of implementing the invention, at least one of the layers may be formed by at least one of the techniques chosen from the group consisting of the following techniques: plasma deposition, evaporation, CVD, sputtering, and combinations of at least two of these techniques.

The binder used for manufacturing the first layer may be different from the binder used for manufacturing the second layer.

The processes of the invention may advantageously be used for manufacturing cathode multilayer materials.

The first solid layer may then advantageously be based on, preferably consist of, materials of the $LiFePO_4$ type.

Preferably, the second solid layer may then be based on, preferably consist of, a material chosen from the group formed by materials of the $LiCoO_2$, $LiMn_2O_4$, $LiMn_{1/3}Co_{1/3}Ni_{1/3}O_2$ or $LiNi_xCo_yAl_zO_2$, (0<x, y, z<1), type, and by materials of the type comprising mixtures of at least two of the latter.

According to a preferred method of implementation, the first layer may be of the $LiCoO_2$, $LiMn_2O_4$, $LiMn_{1/3}Co_{1/3}Ni_{1/3}O_2$ or $LiNi_xCo_yAl_zO_2$, (0<x, y, z<1), type, or a mixture thereof, and the second layer is of the $LiFePO_4$, carbon-coated $LiFePO_4$, $FePO_4$ or carbon-coated $FePO_4$ type, or of the type comprising mixtures of at least two of the latter.

The binder of the first solid layer may advantageously be of the water-soluble binder type.

The binder in the second solid layer may preferably be of the PVDF or PTFE type.

According to another variant, the solvent used for the coating may advantageously be of the aqueous type.

According to another variant of particular advantage, the solvent used for the coating may be of the NMP or cyclopentanone type.

The binder of the first solid layer may preferably be of the PVDF or PTFE type.

The binder in the second solid layer may advantageously be of the water-soluble binder type.

Preferably, the solvent used for the coating may be of the NMP or cyclopentanone type.

Advantageously, the solvent used for the coating may be of the water type.

The process may be particularly advantageous when the binder of the first solid layer is of the water-soluble binder type and the binder of the second solid layer is of the NMP or cyclopentanone type.

The process may be particularly advantageous when the coating of the first solid layer is of the water type and that used for the coating of the second solid layer is of the NMP or cyclopentanone type.

Advantageously, the binder of the first solid layer may be of the NMP or cyclopentanone type and the binder of the second solid layer may be of the water-soluble binder type.

When the solvent used for the coating of the first solid layer is of the water type, that used for the coating of the second solid layer may advantageously be of the solventless type.

The processes of the invention have a particular advantage in the production of anode-type electrodes. In this case, the first solid layer may advantageously be of the natural or artificial graphite type and the second solid layer may be of the $Li_4Ti_5O_{12}$, Sn, Al, Ag, Si, $SiO_x$, $SiO_x$-graphite or $SiO_x$-carbon type, with x greater than 0 but not exceeding 2.

According to another variant, the first solid layer may be of the $Li_4Ti_5O_{12}$, Sn, Al, Ag, Si, $SiO_x$, $SiO_x$-graphite or $SiO_x$-carbon type, with x greater than 0 but not exceeding 2, and the second solid layer may be of the natural or artificial graphite type.

According to an advantageous variant of the process, the binder and the solvent used in the first layer may be a water-soluble binder and water respectively.

According to another advantageous variant, the binder and the solvent used for forming the first layer may be PVDF or PTFE and NMP or cyclopentanone respectively.

According to another advantageous variant, the binder and the solvent used for forming the second layer may be PVDF or PTFE and NMP or cyclopentanone respectively.

Preferably, the binder and the solvent used in the second layer may be a water-soluble binder and water respectively.

A third subject of the present invention is formed by the multilayer materials obtained by implementing one of the processes defined in the second subject of the present invention.

A fourth subject of the present invention is formed by the electrochemical generators comprising at least one anode, at least one cathode and at least one electrolyte. These generators are characterized in that they contain at least one electrode containing one of the materials defined in the first subject of the invention or as obtained by one of the processes defined in the second subject of the invention.

Preferred subfamilies of generators of the invention correspond:
- to electrochemical generators of the cathode/electrolyte/anode type; and
- to electrochemical generators of the liquid electrolyte type, the electrolyte then advantageously being of the gel type.

Preferably, in the generators of the invention, the electrolyte may be composed of at least one salt and at least one solvent.

Advantageously, in such electrochemical generators, the salt may be chosen from the group consisting of salts of the LiFSI, LiTFSI, LiBF$_4$, LiPF$_6$, LiClO$_4$, LiCF$_3$SO$_2$, LiBETI, LiBOB and LiDCTA type and of mixtures of at least two of the latter.

Preferably, the solvent may be chosen from the group of solvents of the EC, DEC, PC, DMC, EMC, and GBL type and mixtures of at least two of the latter.

According to another advantageous method of implementation, the gel electrolyte may be formed from at least one polymer, at least one salt and at least one plasticizer. In this case, the polymer may be preferably chosen from the group of polymers of the polyether, PVDF, PAN and PMMA type and from mixtures of at least two of the latter.

According to another advantageous method of implementation, the salt may be chosen from the group of salts of the LiFSI, LiTFSI, LiBF$_4$, LiPF$_6$, LiClO$_4$, LiCF$_3$SO$_2$, LiBETI, LiBOB and LiDCTA type and mixtures of at least two of the latter.

Advantageously, in the generators of the invention, the plasticizer may be chosen from plasticizers of the EC, DEC, PC, DMC, EMC, GBL, TESA and VC type and mixtures of at least two of the latter.

The gel may then be formed thermally by IR, UV or an electron beam, or by a combination of at least two of these techniques.

The electrochemical generators of the invention are characterized in that they are overcharge-resistant and safe.

These electrochemical generators are also characterized in that the temperature in the generator in the presence of an overcharge of 12 volts or higher is less than 80° C.

A preferred subfamily of generators of the invention may be formed by the generators that have less than 100 ppm, and preferably no trace, of a deposit of metallic lithium during a rapid charge.

A fifth subject of the present invention is formed by the cathodes based on at least one cathode multilayer material defined above in the first and second subjects or as obtained by the processes of the third subject of the invention.

A preferred subfamily of these cathodes may consist of those in which at least one of the electrochemically active materials present in the multilayer material is basic and preferably chosen from the group consisting of LiFePO$_4$ particles, Li$_3$PO$_4$ particles and mixtures of the latter.

Advantageously, at least one of the electrochemically active materials present in the multilayer material may be coated with a layer of a basic material.

A sixth subject of the present invention is formed by the anodes based on at least one anode multilayer material defined above in the first and second subjects or as obtained by the processes of the third subject of the invention.

A preferred subfamily of these anodes may consist of those in which at least one of the electrochemically active materials present in the multilayer material is a capacity reservoir, the capacity of which is at least 10% of the total capacity of the anode.

Preferably, the capacity reservoir material may be chosen from the group consisting of Li$_4$Ti$_5$O$_{12}$, Ag, Sn, Si, Al, SiO$_x$, SiO$_x$-graphite and SiO$_x$-carbon, with x greater than 0 but not exceeding 2, and mixtures of at least two of the latter.

A seventh subject of the present invention consists of the multilayer materials according to the first subject, or as obtained by one of the processes according to the second subject of the invention, and in which the electronically conductive material is of the carbon, graphite or fiber type, or a mixture of at least two of the latter. In this case, the carbon may preferably be of the Ketjen, Shawinigan or Denca type, or of the type comprising mixtures of at least two of the latter. Even more advantageously, the graphite may be of the artificial or natural type. In this case, the fiber may be of the VGCF (vapor growth carbon fiber), exmesophase or expal(polyvinyl acronitrile) type or of the type comprising a mixture of at least two of the latter.

An eighth subject of the present invention consists of the processes according to the second subject for forming a material according to one of the first, fourth and fifth subjects, using:
- an aqueous solution particularly suitable for coating on an anode support, which solution is formulated as follows, the percentages being by weight:
  - at least 64% graphite; and
  - at least 3% water-soluble binder;
  - 0.1 to 2% thickener; and
  - at most 27% water; or
- an aqueous solution particularly suitable for coating on a cathode support, which solution is formulated as follows, the aqueous solution used for the coating containing by weight:
  - at least 64% LiFePO$_4$; and
  - at least 3% water-soluble binder;
  - 0.1 to 2% thickener; and
  - at most 27% water.

BRIEF DESCRIPTION OF THE DRAWINGS

FIG. 1 shows one of the configurations of multilayer materials of the invention according to variants I, II, III and IV presented.

FIG. 2 shows one of the possible configurations for the multilayer materials of the invention for the anode and for the cathode and in which the adjacent layers have been formed with various aqueous/organic systems. These configurations differ from those shown in FIG. 1 by the fact that the active material present in the layers A and A' is now present in the layers B and B' respectively.

FIG. 3 shows the formation of a multilayer material of the invention by transferring the layer B, initially attached to the support PP, onto the layer A.

DETAILED DESCRIPTION OF THE PREFERRED EMBODIMENTS

Figure 4:
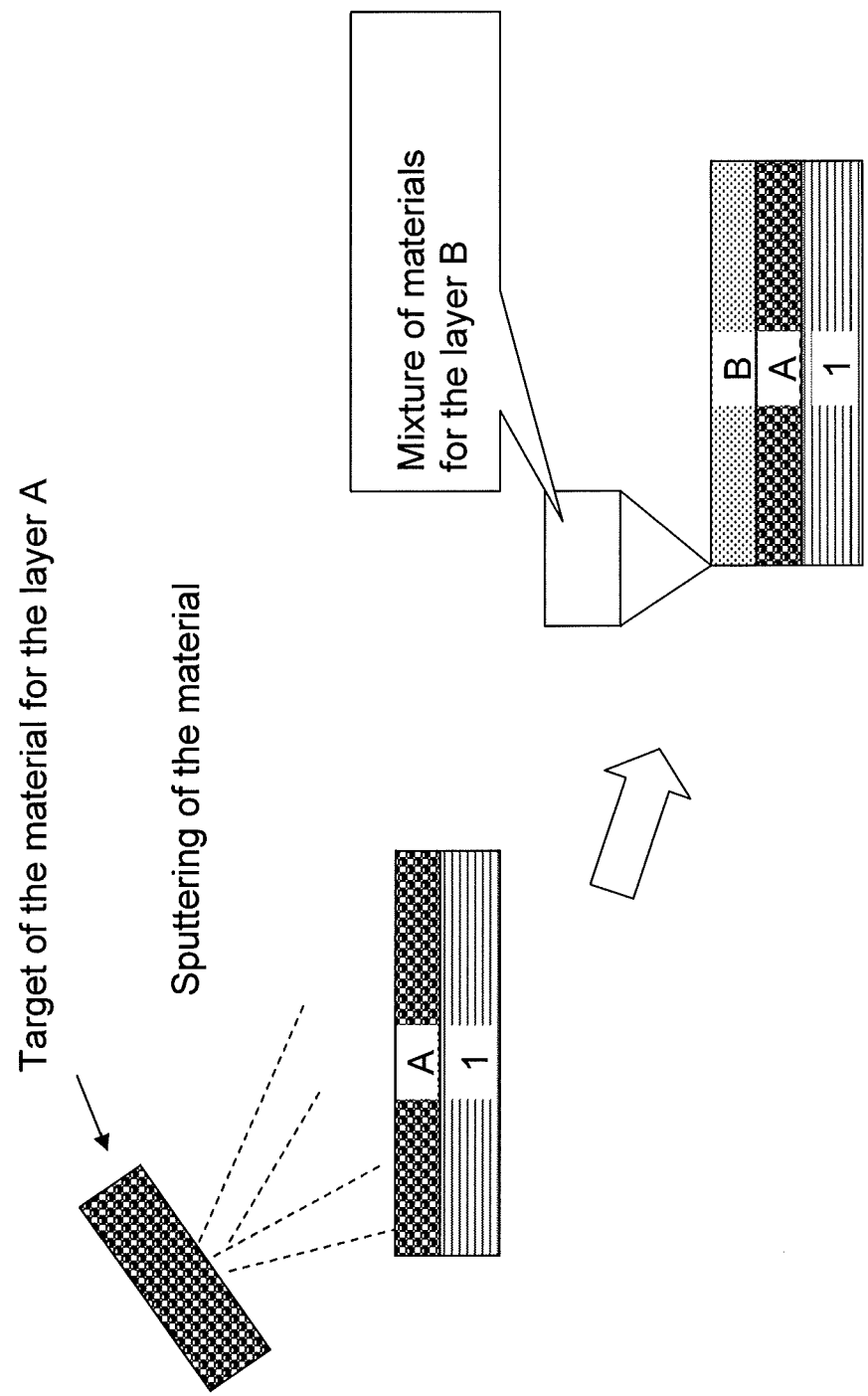
FIG. 4 shows a multilayer material of the invention in which the layer A has been obtained by sputtering (without a binder) the active material A onto the solid support 1.

Within the context of this disclosure, the term "multilayer electrode" is likened to an electrode characterized by a superposition of at least two layers on its surface.

Within the context of this disclosure, the "thickness constancy of a layer" was measured using the scanning electron microscope (SEM) method. In the case of the present invention, the SEM used was a HITACHI S-3500N with an integrated computer. The apparatus was provided with a program giving the thickness measurement for each linear millimeter of the specimen. The values obtained were exploited using the Excel® program, these being presented in the form of two-dimensional curves: length of the specimen and thicknesses measured over each millimeter of the segment. The constancy was determined by measuring the deviations between the average value of the specimen thickness and the extreme values measured. Thus, an average specimen thickness of 40 microns constant to 95% means that the average thickness varied between 38 and 42 microns.

Within the context of this disclosure, the "average depth of penetration of a layer into another" was measured using the scanning electron microscope (SEM) method, and represents the statistical average of the penetrations measured every linear millimeter of the specimen.

Within the context of this disclosure, the term "coating" represents a method of overlaying a support with an electrode.

Within the context of this disclosure, the function of a binder is to chemically bind the particles of an electrochemically active material that are present in a solution and also when they are present in the solid layer.

Within the context of this disclosure, the function of a thickener is to increase the viscosity of the solution of the mixture to be coated, said solution containing particles of an electrochemically active material, the binder and the solvent.

All kinds of binders can be used. Those described in international application PCT/CA03/01739 and in the corresponding European application bearing the number EP 1,573,834 (HYDRO-QUEBEC), the contents of which are incorporated by reference in the present application, are particularly advantageous within the context of the formation of multilayer structures of the invention, and more particularly within the context of the techniques for forming solid layers by coating using at least one aqueous mixture of an electrochemically active material.

Preferably, the binder and the thickener used are generally soluble to at least 20% in water when they are introduced, at room temperature, in an amount of 20 grams in 100 grams of water. Preferably, they are soluble to at least 50% and more advantageously still to at least 90%.

Even more advantageously, the thickener is soluble in water and may be chosen from the group formed by natural celluloses, physically and/or chemically modified celluloses, natural polysaccharides and chemically and/or physically modified polysaccharides, these having a molecular weight of between 27 000 and 250 000.

Advantageously, the thickener is chosen from the group formed by carboxymethylcelluloses, hydroxymethylcelluloses and methylethylhydroxycelluloses.

According to a preferred embodiment, the thickener is chosen from the group consisting of the carboxymethylcelluloses of Cellogen® type that are sold by the company Dai-Ichi Kogyo Seiaku Co. Ltd in Japan, especially under the brand names EP, 7A, WSC, BS-H and 3H.

The soluble binder is advantageously selected from the group formed by natural and/or synthetic rubbers.

The binder is of the nonfluorinated type or weakly fluorinated type. To give an example, since LiF is insoluble in water, it cannot be used within the context of the invention.

Among rubbers, those of synthetic type, and more particularly those chosen from the group formed by SBR (Styrene Butadiene Rubber), NBR (butadiene-acrylonitrile rubber), HNBR (hydrogenated NBR), CHR (epichlorohydrin rubber) and ACM (acrylate rubber), are particularly advantageous.

The soluble rubbers used, and especially those of the SBR family, are preferably in the form of a paste.

To give an example, mention may be made of the SBR sold by the company NIPPON ZEON'S BINDER BATTERY GRADE under the brand name (BM-400B) or equivalent, and the thickeners of the Cellogen® type known by the abbreviations EP and/or 3H.

Usually, the thickener/binder ratio varies from 10 to 70%, preferably from 30 to 50%. The binder content is advantageously between 1 and 70% and that of the thickener between 1 and 10%, in an aqueous solution.

If PVDF is used as binder, its content is 3 to 40% and that of the active material is 60 to 97%.

An aqueous solution particularly suitable for coating on an anode support may be formulated as follows, the percentages being by weight:

at least 64% graphite; and
at least 3% water-soluble binder;
0.1 to 2% thickener; and
at most 27% water.

An aqueous solution particularly suitable for coating on a cathode support may be formulated as follows, the aqueous solution used for the coating containing by weight:

at least 64% $LiFePO_4$; and
at least 3% water-soluble binder;
0.1 to 2% thickener; and
at most 27% water.

When implementing the process, the electrode is dried by removing, preferably to at least 95%, the water present in the solution used to carry out the coating step.

Various techniques known to those skilled in the art in question can be used to remove the traces of $H_2O$ present on the surface of the electrode, after the latter has been covered with the aqueous solution. These traces are in particular removed thermally, in line with the EXT, DBH and/or DB process or by infrared at a temperature of advantageously between 80 and 130° C. for a time of between 1 and 12 hours.

Within the context of this disclosure, the term "collector" is likened to an electrode support that is electrochemically inactive but electronically conductive.

Within the context of this disclosure, the term "doctor blade" represents a coating method in vertical mode.

Within the context of this disclosure, the term "extrusion" represents a particular coating method in which the mixture to be coated is passed under pressure through a die so as to speed up the coating process.

Within the context of this disclosure, the term "calendering" represents the pressing of the electrodes so as to obtain an optimum electrode density, which is expressed in grams per $cm^3$.

Within the context of this disclosure, as regards the pH of the particles of electrochemically active materials (EAM), the pH of an EAM represents the measured value, using a conventional glass electrode, in a solution of the EAM obtained by dissolving, under standard temperature and pressure conditions, 0.15 grams of the EAM in 10 cc of water. The solution is left for one week under standard temperature conditions and then stirred just before taking the measurement with an OAKTON Series 2100 apparatus, sold by the company OAKTON. Within the context of the present invention, any specimen having a pH below 7 is referred to as an acid EAM while any specimen having a pH above 7 is referred to as a basic EAM.

Within the context of this disclosure, the "physical techniques" comprise techniques such as plasma deposition, evaporation, sputtering and all similar techniques well known to those skilled in the art.

Within the context of this disclosure, the "chemical techniques" comprise those such as CVD (Chemical Vapor Deposition) and spin coating.

The formation of a multilayer material of the (PVDF/WSB) or (WSB/PVDF) type, where WSB stands for Water-Soluble Binder, and the use of a hybrid binder in a multilayer cathode or anode will be explained below.

One particularly advantageous method of implementing the invention lies in a multilayer coating process using two binders having different chemistries: one being based on a non-aqueous system and the other based on an aqueous system.

Cathode—The cathode consists of a minimum of two layers of active materials, A and B respectively, as described in FIG. 1.

In case I, the layer A is of the $LiFePO_4$ type with a water-soluble binder. The thickness of the layer A may be greater or less than that of the layer B. The coating to form the cathode A is 100% water-based. The cathode B consists of $LiCoO_2$, $LiMn_2O_4$, $LiNiO_2$, $LiMn_{1/3}Co_{1/3}Ni_{1/3}O_2$ or of a mixture of at least two of the latter. The binder used for the layer B is based on PVDF or PTFE. The thickness of this layer B may be greater or less than the layer A. The solvent used for the coating to form the layer B is organic, preferably of the NMP or cyclopentanone type.

Because different coating solvents are used in the layers A and B, the binder of the inner layer A is not dissolved by the solvent for the outer layer B. In addition, it provides the layer A with mechanical and chemical stability (FIG. 1), particularly owing to the fact that the binder is not soluble in the solvent used for forming the second layer.

In case II, the layer A' is of the $LiFePO_4$ type, and a binder of the PVDF or PTFE type soluble in a solvent of the NMP or cyclopentanone type is used. The thickness of the layer A' may be greater or less than that of the layer B'. The layer B' consists of $LiCoO_2$, $LiMn_2O_4$, $LiNiO_2$, $LiMn_{1/3}Co_{1/3}Ni_{1/3}O_2$ or of a mixture thereof. The binder used for the coating to form the layer B is based on water and the solvent used consists of 100% water. The thickness of this layer B' may be greater or less than the layer A' (FIG. 2).

The manufacturing process is carried out using the doctor blade technique or by extrusion on an aluminum collector. The first layer is coated onto the aluminum collector, while the second layer is coated onto the first layer without significant dissolution or deformation of the inner layer A or A'.

Other coating processes may be used, such as vertical coating on an aluminum (expanded metal) mesh. The first layer A or A' is coated onto the aluminum mesh and the second layer B or B' is extended over the first layer A or A' without significant dissolution or deformation of the inner layer A or A'.

In case III, in another advantageous embodiment of the invention, the two layers are formed from the same binder and the same solvent. The first layer A is coated onto the aluminum collector. The layer B is coated onto a polypropylene (PP). Immediately afterwards, the layer B is transferred onto the layer A by lamination. The two layers are formed from PVDF or PTFE dissolved in NMP or in cyclopentanone.

In a second case, the two layers are formed from a water-soluble binder and the solvent used consists of 100% water (FIG. 3).

In both configurations, the thickness of the layer A may be greater or less than that of the layer B.

Other coating processes may be used, such as vertical coating on a copper (expanded metal) mesh. The first layer A is coated onto a copper film. The second layer B is extended over a PP film. The latter layer B is then transferred onto the first layer A by lamination without any deformation of the inner layer A.

Anode

In case I, the first layer A is of the natural or artificial graphite type and the binder is of the water-soluble type. The solvent used for the coating to form the layer A consists of 100% water. The thickness of this layer A may be greater or less than the layer B. The layer B is composed of hard carbon, $Li_4Ti_5O_{12}$, Sn, Al, Ag, Si, $SiO_x$, $SiO_x$-graphite or $SiO_x$-carbon, with x greater than 0 but not exceeding 2. The binder used in this layer B is of the PVDF or PTFE type and the solvent used is of the NMP or cyclopentanone type (FIG. 1).

In case II, the layer A' is of the natural or artificial graphite type used with a binder of the PVDF or PTFE type soluble in a solvent of the NMP or cyclopentanone type. The thickness of the layer A' may be greater or less than that of the layer B'.

The layer B' is composed of hard carbon, $Li_4Ti_5O_{12}$, Sn, Al, Ag, Si, $SiO_x$, $SiO_x$-graphite or $SiO_x$-carbon or the like, with x greater than 0 but not exceeding 2. The binder used in this layer B' is water-based and the solvent used consists of 100% water. The thickness of this layer B' may be greater or less than the layer A'.

The multilayer anode is manufactured using the doctor blade technique or by extrusion on a copper collector. The first layer is coated onto the copper collector and the second layer B or B' is coated onto the first layer without any dissolution or deformation of the inner layer A or A'.

Other coating processes may advantageously be used, namely vertical coating on a copper (expanded metal) mesh. The first layer A or A' is coated onto the copper mesh and the second layer B or B' is extended over the first layer A or A' without any significant dissolution or deformation of the inner layer A or A'.

In case III, in another preferred embodiment of the invention, the two layers are formed from the same binder and the same solvent. The first layer A is coated onto the copper collector. The layer B is coated onto a polypropylene (PP). Immediately afterwards, the layer B is transferred onto the layer A by lamination. The two layers are formed from PVDF or PTFE dissolved in NMP or in cyclopentanone.

In a second case, both layers are formed from the water-soluble binder and the solvent used is 100% water.

In both configurations, the thickness of the layer A may be greater or less than that of the layer B.

Other coating processes may be used, such as vertical coating on a copper (expanded metal) mesh. The first layer A is coated onto a copper film. The second layer B is extended over a PP film. The latter layer B is then transferred onto the first layer A by lamination, without any deformation of the inner layer A.

Figure 5:
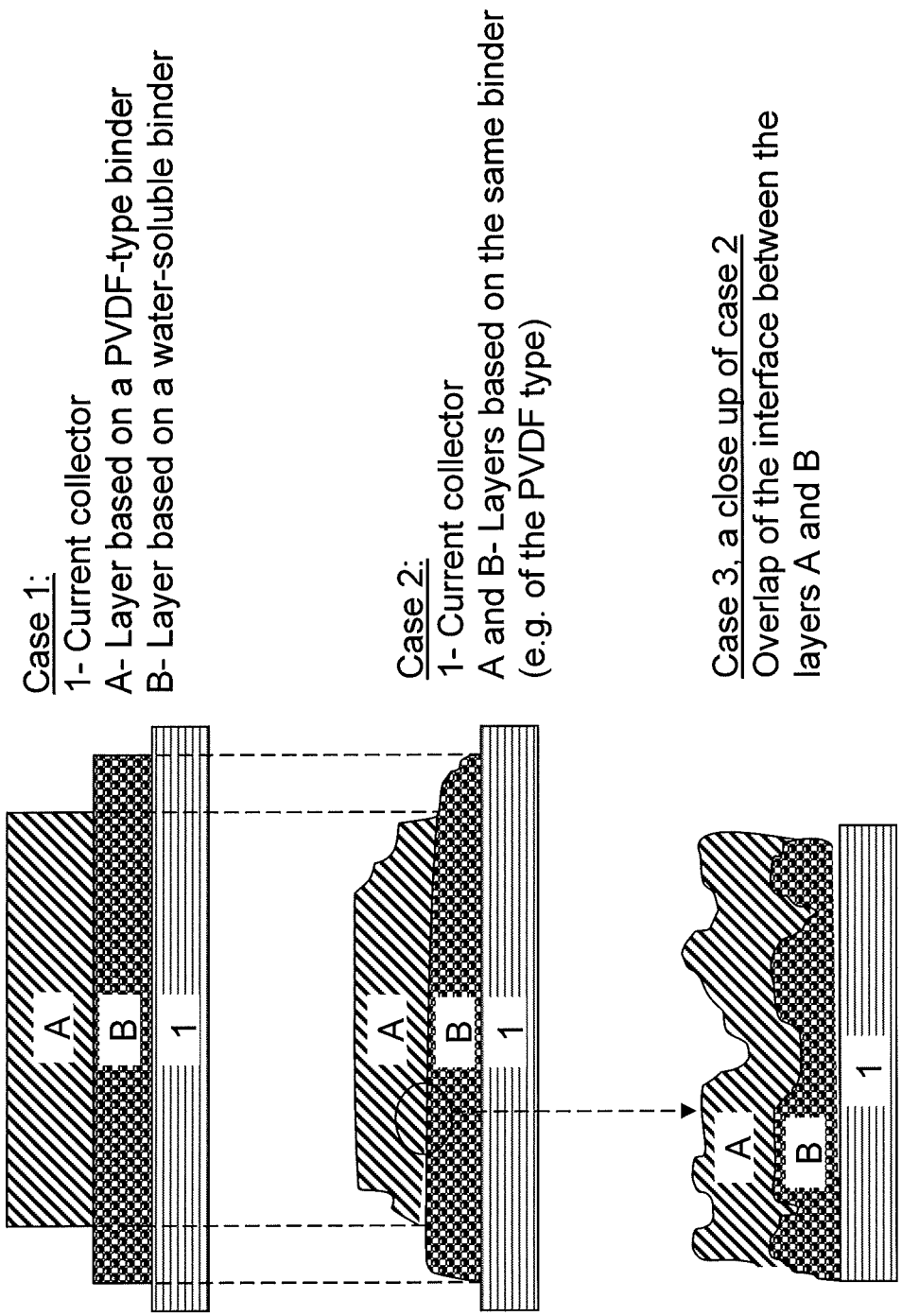
FIG. 5 shows, in case 1, a multilayer material of the invention in which the active material incorporated into the second layer consists of particles of an active material coated with smaller-sized particles of LiFePO$_4$, while in case 2, and case 3 which represents an enlargement of case 2, the figure shows a comparison between the form of a section of multilayer material of the prior art, in which the same binder is present in both layers, and the form of a material of the invention (case 1) in which the binder is not the same in both layers.
Figure 6:
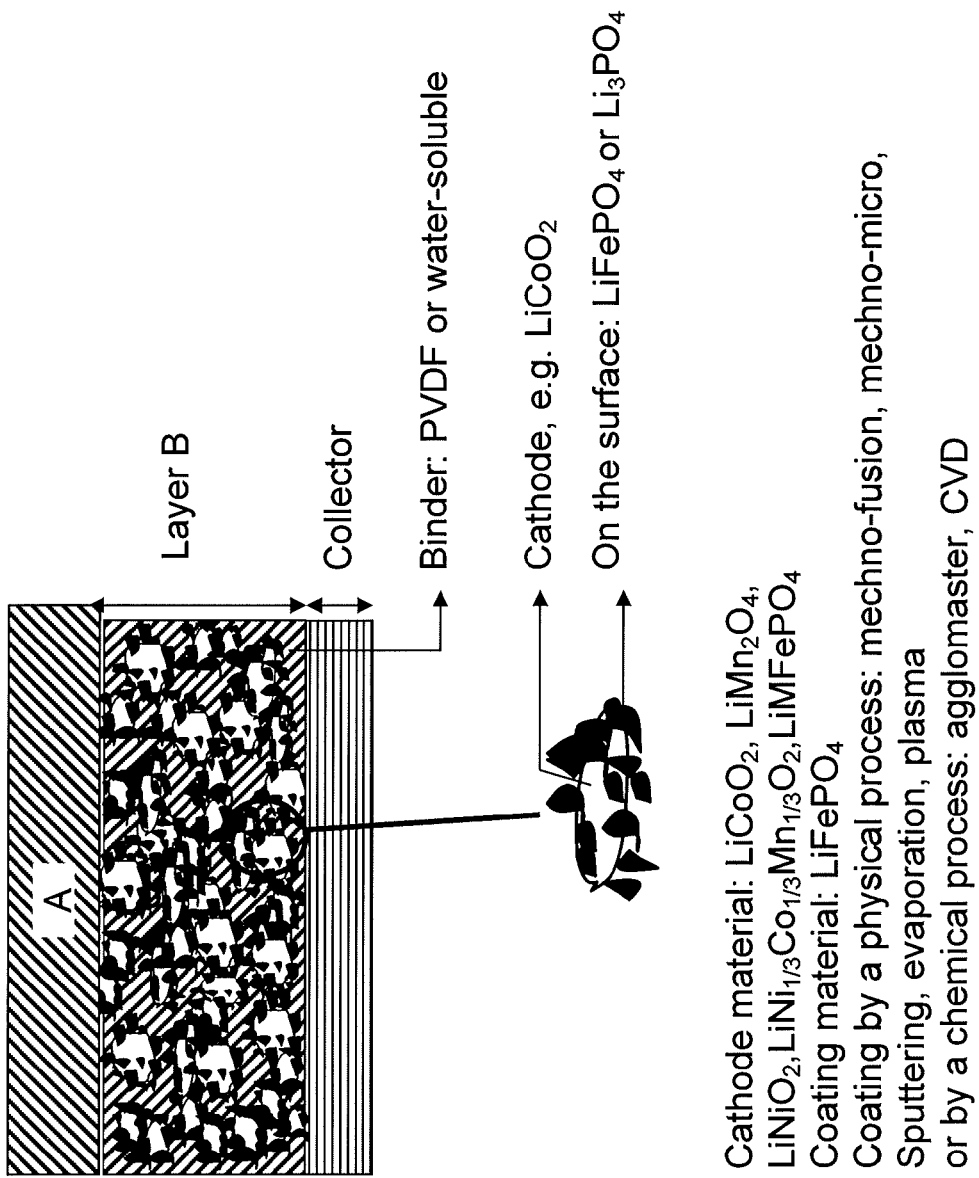
FIG. 6 shows a multilayer material of the invention in which an electrochemically active material consists of particles coated with a layer of basic particles.
Figure 7:
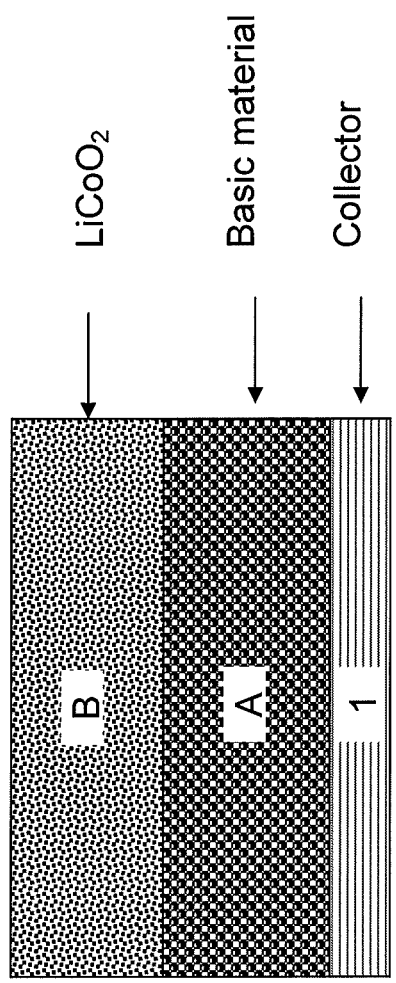
FIG. 7 shows a multilayer material of the invention in which an electrochemically active material present in at least one solid layer is ionically conductive.

According to another advantageous embodiment, at least one of the layers of the anode or cathode is deposited by physical techniques such as plasma deposition, evaporation or sputtering, or by chemical techniques such as CVD or spin coating, or any other technique (FIG. 5).

According to another preferred variant of the invention, the particles of the cathode multilayer material ($LiCoO_2$, $LiMn_2O_4$, $LiMn_{1/3}Co_{1/3}Ni_{1/3}O_2$) are coated with the $LiFePO_4$ material using techniques of the mechanofusion, plasma deposition, evaporation or sputtering type, or chemical techniques such as CVD, spin coating or other equivalent techniques.

Likewise, the anode material (natural or artificial graphite or carbon) is advantageously coated with one of the components: $Li_4Ti_5O_{12}$, Sn, Al, Ag, or Si or a mixture of at least two of the latter.

These coated materials are used to manufacture the cathode or the anode with a binder either of the PVDF or PTFE type or with a water-soluble binder.

EXAMPLES

The following examples are given purely for illustration and should not be interpreted as constituting any limitation on the subject matter of the present invention.

Example 1

$LiCoPO_2$/$LiFePO_4$/Al Multilayer Material 46.87 grams of $LiFePO_4$, 3.01 grams of carbon black, 1.42 grams of Cellogen® thickener and 1.77 grams of SBR-type binder were mixed in water.

A 10 micron electrode was coated onto a carbon-coated aluminum collector using a doctor blade. The $LiFePO_4$/Al film obtained constituted the first solid layer.

33.09 grams of $LiCoO_2$, 2.12 grams of carbon black and 4.80 grams of PVDF were mixed in NMP (N-methylpyrrolidone).

The $LiCoO_2$ cathode was coated onto the $LiFePO_4$/Al film, the $LiCoO_2$ layer had a thickness of 40 microns and the cathode was a double-layer cathode of the $LiCoO_2$/$LiFePO_4$/Al type, called configuration 1.

The measured constancy for the thickness of the layer 1 was 95%, i.e. the average thickness of the layer was 40 microns and the thickness of the layer varied between 38 and 42 microns. The same applied for the solid layer 2.

Example 2

$LiN_{1/3}Co_{1/3}Mn_{1/3}O_2$/$LiFePO_4$/Al Multilayer Material 46.85 grams of $LiFePO_4$, 3.05 grams of carbon black, 1.45 grams of Cellogen® thickener and 1.78 grams of SBR-type binder were mixed in water.

10 microns of the $LiFePO_4$/Al first layer were coated using a doctor blade.

The second layer was prepared from 33.11 grams of $LiCo_{1/3}Ni_{1/3}Mn_{1/3}O_2$, 2.13 grams of carbon black and 83 grams of PVDF mixed in NMP. The second layer was deposited using a doctor blade onto the $LiFePO_4$/Al first layer. The second layer had a thickness of 40 microns.

The multilayer material thus obtained was of the $LiN_{1/3}Co_{1/3}Mn_{1/3}O_2$/$LiFePO_4$/Al type and called configuration 2.

The measured constancy for the thickness of the layer 1 was 95%, i.e. the average thickness of the layer was 40 microns and the thickness of the layer varied between 38 and 42 microns. The same applied to the solid layer 2.

Example 3

SNG12/$Li_4TiO_{12}$/copper Multilayer Material 46.81 grams of $Li_4Ti_5O_{12}$, 3 grams of carbon black, 1.43 grams of thickener and 1.75 grams of SBR-type binder were mixed in water. The electrode was coated using a doctor blade onto a copper collector. The thickness of the $Li_4Ti_5O_{12}$ first layer was 10 microns.

33.12 grams of SNG12 natural graphite, 1.06 grams of carbon black and 4.80 grams of PVDF were mixed in the NMP solvent.

The graphite second layer was deposited onto $Li_4Ti_5O_{12}$/copper using a doctor blade. The thickness of the second layer was 50 microns. The SNG12 graphite/$Li_4TiO_{12}$/copper configuration is called configuration 3.

The measured constancy for the thickness of the layer 1 was 95%, i.e. the average thickness of the layer was 40 microns and the thickness of the layer varied between 38 and 42 microns. The same applied to the solid layer 2.

The thickness of the layer 1 was 45±2 microns, corresponding to a constancy of 95.6%.

Example 4

$Li_4Ti_5O_{12}$/SNG12/copper Multilayer Material 33.15 grams of natural graphite, 1.05 grams of carbon black and 4.83 grams of PVDF were mixed in the NMP solvent. The graphite first layer was coated onto a copper collector using a doctor blade. The thickness of the first layer thus obtained was 45 microns.

33.12 grams of $Li_4Ti_5O_{12}$, 3.12 grams of carbon black, 1.42 grams of Cellogen® thickener and 1.774 grams of SBR-type binder were mixed in water.

The second layer was coated onto the graphite/copper first layer using a doctor blade. The thickness of the second layer was 10 microns. The $Li_4Ti_5O_{12}$/SNG12/copper configuration obtained is called configuration 4.

The thickness of the layer 1 was 45±2 microns, corresponding to a constancy of 95.6%.

Example 5

Lithium Battery with a Multilayer Material According to Configuration 1

A cell of the configuration 1/$LiPF_6$/EC+DEC/Li type was charged up to 12 volts. The temperature of the battery rose to 75° C. and returned to 25° C. after 1 minute.

Example 6

Battery of Configuration 2 Type

A cell of the $LiCoO_2$/$LiPF_6$/EC+DEC/Li type was charged up to 12 volts. The temperature increased up to 150° C. but returned to 60° C. after 1 minute.

Example 7

Configuration 1/$LiPF_6$/EC+DEC/Configuration 3 Lithium Battery

A cell of the configuration 1/$LiPF_6$/EC+DEC/configuration 2 type was charged at 2 C (30 minutes) and the voltage maintained at 4.2 volts for 24 hours.

No lithium dendrites or deposits were detected on the anode of configuration 3.

Example 8

Configuration 2/LiPF$_6$/Configuration 4 Lithium Battery

A cell of the configuration 2/LiPF$_6$/configuration 4 type was charged at 2 C (30 minutes) and the voltage maintained at 4.3 volts for 24 hours.

No lithium dendrites or deposits were observed on the anode (configuration 4).

Example 9

LiCoO$_2$/LiPF$_6$/graphite Battery

A cell of the LiCoO$_2$/LiPF$_6$/graphite type, in which the electrode materials were of the single layer type, was charged at 2 C (30 minutes) and maintained at 4.2 volts for 24 hours.

In this cell, the formation of a lithium deposit was observed on the anode.

One of the key advantages of the multilayer materials of the invention lies in the improved overcharge resistance that they give generators into which they are incorporated as constituent electrode element.

In the presence of overcharging caused by external agents, the cathode of the generator becomes very acidic and reacts with the electrolyte, in particles with the salt, to form acids of the HF(LiPF$_6$) or HCl(LiClO$_4$) type. These formation reactions are exothermic, generate oxygen from LiCoO$_2$ and contribute to raising the temperature of the generator considerably. The acids vaporize and react with the battery components, up to the point of starting a fire inside the generator.

Using cathodes of the LiFePO$_4$ type, or very basic pH cathodes, makes the battery considerably safer, in particular by avoiding acid formation and preventing oxygen generation.

Another option for further optimizing the overcharge-resistance capability lies in coating the particles of electrochemically active material with a layer of a highly basic material, such as Li$_3$PO$_4$ or the like. In particular, this prevents acid from the cathode coming into contact with the electrolyte during the charge.

It is particularly advantageous to use, as particles of electrochemically active material, those having a pH greater than 7, such as LiFePO$_4$ particles having a pH of 9.9 and LiCoO$_2$ particles having a pH of 8.6.

The two possible mechanisms for minimizing or even inhibiting the undesirable overcharge phenomenon are shown in FIGS. 1 to 4 and 6 and 7.

Although the present invention has been described with the aid of specific embodiments, it should be understood that several variations and modifications may be grafted onto said embodiments and that the present invention encompasses such modifications, usages or adaptations of the present invention that will become known or conventional within the field of activity to which the present invention pertains, and which may be applied to the essential elements mentioned above.

The invention claimed is:

1. A multilayer material comprising:
    a solid support; and
    at least two superposed solid layers which contain particles of an electrochemically active material and a binder, the first solid layer adhering to the solid support and the second solid layer adhering directly to the first solid layer and wherein:
    at least one of the first and second solid layers has a thickness, measured using a scanning electron microscope method, constant to at least 95%;
    an average depth of penetration of the second solid layer into the first solid layer which is less than 10% of the thickness of the first solid layer;
    the binder in the first solid layer is of a different nature from the binder in the second solid layer;
    the binder present in one of the first and second layer is soluble at 25° C. in water with a concentration of greater than 1 g/liter, and is soluble at 25° C. in a solvent different from water with a concentration of less than 1 g/liter; and
    the binder present in the other of the first and second solid layer is soluble at 25° C. in water with a concentration of less than 1 g/liter, and is soluble at 25° C. in a solvent different from water with a concentration of greater than 1 g/liter; and
    the electrochemically active material in one of the first or second solid layers is selected from the group consisting of:
    Li$_4$Ti$_5$O$_{12}$, Sn, Al, Ag, Si, SiO$_x$, SiO$_x$-graphite, SiO$_x$-carbon, wherein 0<x≤2, mixtures thereof and a complex oxide corresponding to the general formula A$_a$M$_m$Z$_z$O$_o$N$_n$F$_f$ in which:
    A comprises an alkali metal;
    M comprises at least one transition metal, and optionally a metal other than a transition metal, or mixtures thereof;
    Z comprises at least one nonmetal;
    O is oxygen; N is nitrogen and F is fluorine; and
    the coefficients a, m, z, o, n, f≥0 being chosen so as to ensure electroneutrality.

2. The multilayer material of claim 1, wherein the electrochemically active material in the other of the first and second solid layers is selected from carbon, graphite, carbon fibers, and mixtures thereof.

3. The multilayer material as claimed in claim 2, in which the graphite is artificial or natural graphite.

4. The multilayer material of claim 1, in which the binder present in the first or second solid layer represents between 0.5 and 99% of the weight of the solid layer in which it is present.

5. The multilayer material of claim 4, in which the binder in the first layer is SBR.

6. The multilayer material as claimed in claim 4, in which the binder in the second layer is PVDF or PTFE.

7. The multilayer material as claimed in claim 4, in which the binder in the first layer is PVDF or PTFE.

8. The multilayer material as claimed in claim 4, in which the binder in the second layer is SBR.

9. The multilayer material as claimed in claim 4, in which the binder in the first layer is SBR and the binder of the second layer is a PVDF or PTFE soluble in NMP or cyclopentanone.

10. The multilayer material of claim 1, in which at least one of the first and second solid layers contains a thickener, and the thickener present in said first or second solid layer represents between 0.1 and 98% of the weight of the solid layer in which it is present.

11. The multilayer material as claimed in claim 10, in which the thickener is sodium carboxy methylcellulose.

12. The multilayer material of claim 1, which includes a third layer of a solid material of Li$_3$PO$_4$ adhering to the second solid layer.

13. The multilayer material as claimed in claim 1, in which the electrochemically active material of the first solid layer is of natural graphite, artificial graphite, type or a mixture thereof, and the electrochemically active material of the second solid layer is $Li_4Ti_5O_{12}$, Sn, Al, Ag, Si, $SiO_x$, $SiO_x$-graphite, $SiO_x$-carbon, or a mixture thereof.

14. The multilayer material as claimed in claim 1, in which the electrochemically active material of the first solid layer is selected from the group consisting of $Li_4Ti_5O_{12}$, Sn, Al, Ag, Si, $SiO_x$, $SiO_x$-graphite, —$SiO_x$-carbon and a mixture thereof, and the electrochemically active material of the second solid layer is natural graphite, artificial graphite, or a mixture thereof.

15. The multilayer material as claimed in claim 1, in which the solid support comprises a material chosen:
   for an anode, from the group consisting of: copper and expanded copper, aluminum and nickel; and
   for a cathode, from the group consisting of: aluminum, carbon coated aluminum, expanded aluminum, expanded carbon coated aluminum, titanium and platinum.

16. The multilayer material as claimed in claim 1, in which the thickness of:
   the first solid layer is between 1 and 200 μm;
   the second solid layer is between 1 and 200 μm, the second solid layer further including a protective layer is between 100 nanometers and 10 μm.

17. The multilayer material as claimed in claim 1, wherein the multilayer material forms an anode and:
   the first solid layer comprising:
      between 1 and 100% by weight of an active material;
      between 2 and 84% by weight of a binder; and
      between 0 and 98% by weight of a thickener; and
   the second solid layer comprising:
      between 1 and 100% by weight of an active material;
      between 2 and 84% by weight of a binder; and
      between 0 and 98% by weight of a thickener.

18. A process for preparing a multilayer material as claimed in claim 1, said process comprising the steps of:
   a. coating, on the solid support, a mixture comprising particles of a first electrochemically active material, a binder for this first electrochemically active material and a solvent for the binder;
   b. evaporating the solvent still present in the coating to form a first solid layer;
   c. coating, on the first solid layer, a mixture comprising particles of a second electrochemically active material, a binder for the second electrochemically active material and a solvent for the binder; and
   d. evaporating the solvent present in the second coating to form a second solid layer.

19. A cathode based on at least one multilayer material defined in claim 1.

20. An anode based on at least one multilayer material defined claim 1.

21. The anode as claimed in claim 20, in which at least one of the electrochemically active materials present in the multilayer material is a capacity reservoir material, having a capacity which is at least 10% of a total capacity of the anode, wherein the capacity reservoir material is selected from group consisting of $Li_4Ti_5O_{12}$, Sn, Al, Ag, Si, $SiO_x$, $SiO_x$-graphite, $SiO_x$-carbon, wherein $0<x\leq2$, and mixtures thereof.

22. An electrochemical generator comprising at least one anode, at least one cathode and at least one electrolyte, said generator having at least one of the anode or cathode containing a multilayer material as defined in claim 1.

23. The electrochemical generator as claimed in claim 22, in which the electrolyte is a liquid or gel electrolyte.

24. The electrochemical generator as claimed in claim 23, in which the gel electrolyte is formed from at least one polymer, at least one salt and at least one plasticizer.

25. The electrochemical generator as claimed in claim 24, wherein the polymer is selected from the group of polyethers, PVDF, PAN, PMMA, and mixtures of at least two of the latter.

26. The multilayer material as claimed in claim 1, wherein the electrochemically active material in one of the first or second solid layers is selected from the group consisting of: $Li_4Ti_5O_{12}$, Sn, Al, Ag, Si, $SiO_x$, $SiO_x$-graphite, $SiO_x$-carbon, wherein $0<x\leq2$, and mixtures thereof.

27. The multilayer material as claimed in claim 1, wherein the electrochemically active material in one of the first or second solid layers is a complex oxide corresponding to the general formula $A_aM_mZ_zO_oN_nF_f$ in which:
   A comprises an alkali metal;
   M comprises at least one transition metal, and optionally a metal other than a transition metal, or mixtures thereof;
   Z comprises at least one nonmetal;
   O is oxygen; N is nitrogen and F is fluorine; and
   the coefficients a, m, z, o, n, $f \geq 0$ being chosen so as to ensure electroneutrality.

* * * * *